United States Patent [19]
Weidler

[11] 4,147,023
[45] Apr. 3, 1979

[54] CHAIN NET

[76] Inventor: Erhard A. Weidler, Aalen-Unterkochen, Fed. Rep. of Germany

[21] Appl. No.: 859,164

[22] Filed: Dec. 9, 1977

[30] Foreign Application Priority Data

Dec. 17, 1976 [DE] Fed. Rep. of Germany ....... 2658009

[51] Int. Cl.² .............................................. F16G 15/00
[52] U.S. Cl. ........................................... 59/86; 59/93
[58] Field of Search ................. 59/93, 78, 80, 85, 86, 59/87, 90, 35; 245/4; 294/77; 152/171, 231

[56] References Cited

U.S. PATENT DOCUMENTS

| | | | |
|---|---|---|---|
| 2,097,465 | 11/1937 | Morrison | 59/86 |
| 2,709,616 | 5/1955 | Larson | 59/86 |
| 3,707,072 | 12/1972 | Elsasser | 59/85 |

FOREIGN PATENT DOCUMENTS

| | | | |
|---|---|---|---|
| 2112440 | 9/1971 | Fed. Rep. of Germany | 59/85 |
| 2262590 | 7/1974 | Fed. Rep. of Germany | 59/86 |
| 1161490 | 3/1958 | France | 59/86 |

*Primary Examiner*—C. W. Lanham
*Assistant Examiner*—Gene P. Crosby
*Attorney, Agent, or Firm*—Parmelee, Johnson, Bollinger & Bramblett

[57] ABSTRACT

A chain net with at least one nodal point formed by a horizontally arranged chain lock and at least three vertical links connected to each other by a C-shaped basic body of the chain lock, which is closed by a locking element, at least one end of which forms a stop for a horizontal link, the basic body being provided with further stops preventing the vertical links from moving into the area of the locking element.

11 Claims, 12 Drawing Figures

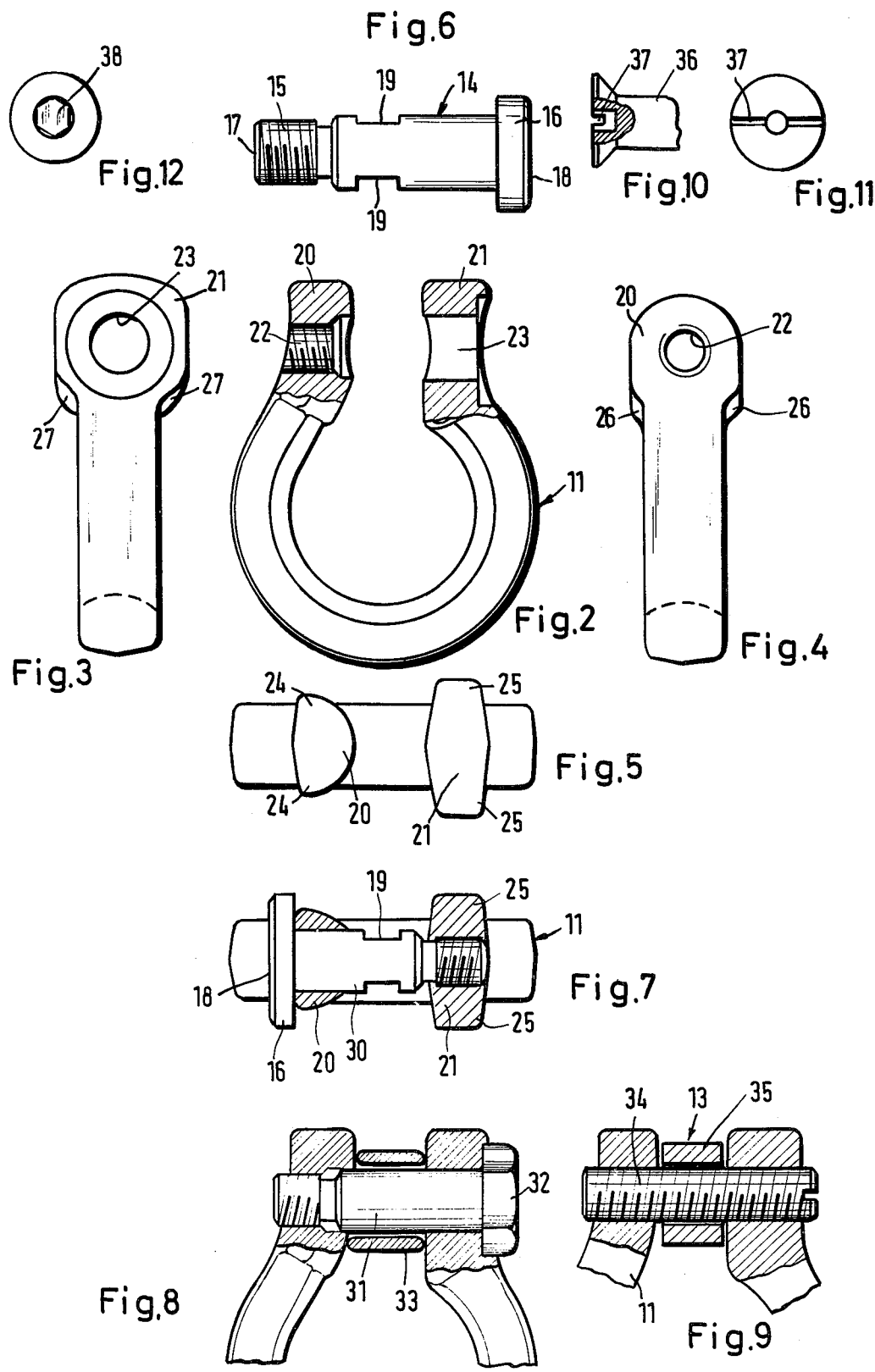

CHAIN NET

DESCRIPTION

The invention relates to a chain net with at least one nodal point consisting of one horizontally arranged chain lock and at least three vertical links hooked therein, which in turn are each connected with a further horizontal link, whereby the chain lock is formed by an essentially C-shaped basic body with an entry slot for the vertical links, which is capable of being bridged by a locking element.

Chain nets of the aforementioned kind are known, which show chain locks with cap-like or fork-like locking pieces, which surround the ends of the basic bodies, being connected with them by cross bolts. These chain locks consist each of at least three parts, namely the basic body, the locking element and at least one locking bolt for the locking element.

Also known are two-piece chain locks with a C-shaped basic body, the entry slot of which is bridged by a locking element formed by a screw bolt. Such chain locks, however, are not suitable for installation in chain nets, as they do not guarantee that no chain links slip into the area of the entry slot and support themselves on the screw bolt. On the contrary, this is intended to happen in the known chain locks.

It is the object of the invention to provide a chain net of the kind described at first with nodal points formed by chain locks, wherein it is guaranteed that the vertical links arranged at the nodal points do not slip into the area of the locking element and stress it.

According to the invention this object is solved therein that in the locking position the foot and/or the head of the locking element form(s) stops for the horizontal links hooked into the vertical links closest to the entry slot and that the basic body is provided with stops, whereby the position of the stops assigned to the vertical links and horizontal links being connected with each other is coordinated in such a way with each other and with the dimensions of the vertical links and the horizontal links that the vertical links cannot get into the area of the locking element.

The chain net according to the invention offers the advantage that it has a very simple nodal point and by a clever design of the locking element and its double use it guarantees a favourable load of the chain lock even under unfavourable conditions. Especially no bending strains are exerted on the locking element.

The invention will be explained in more detail with reference to the accompanying drawing.

FIG. 2 shows partly sectional a side view of the basic body of the chain lock for the nodal point according to FIG. 1;

FIG. 3 shows a view of the basic body in FIG. 2, seen from the right;

FIG. 4 shows a view of the basic body in FIG. 2, seen from the left;

FIG. 5 shows a view of the basic body, seen from the top;

FIG. 6 shows a view of the locking element for the basic body;

FIG. 7 shows partly sectional a view corresponding to that of FIG. 5 of a basic body according to FIGS. 2 – 5 with a locking element with only one stop;

FIG. 8 shows partly sectional a part view of a modified solution with a tension sleeve surrounding the locking element;

FIG. 9 shows partly sectional a partial view of a further variation;

FIG. 10 shows partly sectional the side view of the end of a locking element;

FIG. 11 shows the top view of the end of the locking element according to FIG. 10 and FIG. 12 shows a top view corresponding to FIG. 11 of the end of a further locking element.

Figure 1:
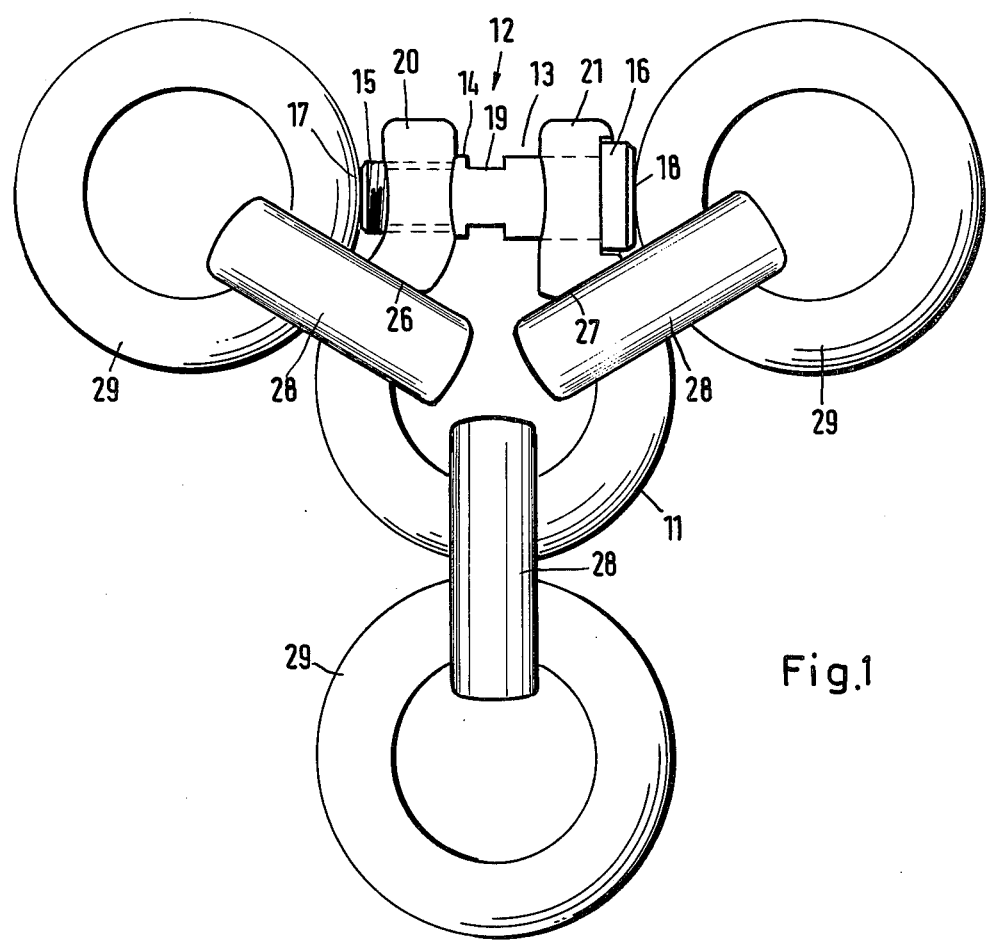
FIG. 1 shows the top view of the nodal point of a chain net.

In the FIGS. 11 is the basic body of a chain lock, which forms a center of a nodal point 12. This basic body has an entry slot 13, which is bridged by a locking element 14 formed by a screw-bolt. The locking element 14 shown separately in FIG. 6 has a foot 15 provided with a thread and a head 16. The front sides of the foot 15 and the head 16 form stops 17 and 18. The cylindrical center part of the locking element connecting the foot 15 with the head 16 is provided with flat portions 19 which make it possible to apply a tool, for example a spanner.

The varying ends 20 and 21, defining the entry slot 13, are provided with bores 22 and 23, of which bore 22 shows an inner thread into which the outer thread of the head 15 fits. Both ends 20 and 21 show projections 24 and 25 respectively, which extend laterally over the main part of the basic body. Parts of these projections form stops 26 and 27 for the vertical links 28 hooked into the basic body, which in turn are connected with horizontal links 29.

As FIG. 1 clearly shows, the stops 17, 18 respectively 26 and 27 are arranged in such a way that the vertical links 28 facing the entry slot 13 cannot slide into the area of the entry slot. Anyhow, the sliding into the area of the entry slot is only possible over the end 20 of the basic body. Due to the fact that stop 17, seen in FIG. 1, projects to the left side over the side-face of the end 20, the vertical link 28, arranged top left in FIG. 1, assumes a position, in which it is impossible for it to slide over stop 26. Only when the locking element 14 is removed can the horizontal link be brought so close to the basic body that the vertical links 28 one after the other are removable over the end 20 of the basic body 11 from the basic body.

The chosen arrangement of the locking element 14 offers the further advantage that the stops 17 and 18 prevent that the ends 20 and 21 of the basic body are pressed together by the horizontal links 29 adjoining the ends.

FIG. 7 shows an embodiment wherein the locking element 30 only forms one stop surface 18 in the region of its head 16, while the foot 15 finishes flush with the end 21. Such a solution is then justifiable, when the projections 25 are sufficiently big to prevent by themselves an undesired displacement of the vertical links 28 in the region of the locking element 30. It is clear that in a case like this all vertical links 28 must be threaded over the end 20 on to the basic body 11.

FIG. 8 shows a variation with a locking element 31, the head 32 of which is developed as hexagon. In an embodiment of this kind it is possible to fasten a distance sleeve 33.

FIG. 9 shows a solution, in which a locking element 34 formed by a threaded bolt serves to bridge the entry slot 13 of the basic body 11, the locking element being secured by a nut 35, by screwing this nut against one of the inner surfaces of the basic body ends defining the entry slot 13.

FIGS. 10 and 11 show the end of a locking element 36, which instead of flat portions is provided with a slot 37 for a screw-driver (not shown). FIG. 12 finally shows the end of a further locking element, the end being provided with an inner hexagon.

I claim:

1. Chain net with at least one horizontally arranged chain lock and at least three vertical links hooked therein, which in turn are each connected with a further horizontal link, said chain lock being formed by an essentially C-shaped basic body with an entry slot for the vertical links and a locking element having a foot on one of its ends and a head on the other of its ends, said locking element bridging said entry slot of said C-shaped body characterized therein that in the locking position the locking element (14, 30, 31, 34, 36) and the basic body (11) form stops (17, 26; 18, 27), the position of the stops assigned to the connected vertical and horizontal links (28, 29), being coordinated in such a way with each other and with the dimensions of the vertical and horizontal links (28, 29) that the vertical links (28) cannot move into the area of the locking element.

2. Chain net according to claim 1, characterized therein that the locking element (14) is formed by a screw bolt.

3. Chain net according to claim 2, characterized therein that in the region of the entry slot (13) the locking element is provided with flat portions (19) which make the application of a tool possible.

4. Chain net according to claim 2, characterized therein that the locking element is provided with a slot (37,38) at one end, to enable the application of a screwing tool.

5. Chain net according to claim 1, characterized therein that the locking element (34) is formed as a threaded bolt, which between the ends of the basic body (11) defining the entry slot (13) is provided with a nut (35) for securing the position.

6. Chain net according to claim 1, characterized therein that the ends of the basic body (11) defining the entry slot (13) are provided with projections (24, 25) extending laterally over the main part of the basic body (11).

7. Chain net according to claim 1, characterized therein that the vertical and horizontal links (28,29) are developed ring-shaped.

8. Chain net according to claim 1 characterized therein that the locking element (14) is a screw bolt, said screw bolt being surrounded by a distance sleeve (33) in the region of the entry slot (13).

9. Chain net according to claim 1 wherein said foot of said locking element defines a stop for preventing the horizontal link closest to said foot from moving into the area of said locking element.

10. Chain net according to claim 1 wherein said head of said locking element defines a stop for preventing the horizontal link closest to said head from moving into the area of said locking element.

11. Chain net according to claim 1 wherein both said head and said foot of said locking element define stops for preventing said horizontal chain links from moving into the area of said locking element.

* * * * *